(12) United States Patent
Noda et al.

(10) Patent No.: US 6,336,125 B2
(45) Date of Patent: *Jan. 1, 2002

(54) METHOD AND DEVICE FOR GENERATING APPLICATION DATA AND STORAGE MEDIUM CONTAINING THEREON A PROGRAM FOR GENERATING APPLICATION DATA

(75) Inventors: Yoshimune Noda; Shuzo Kugimiya, both of Nara (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,991

(22) Filed: Jul. 28, 1998

(30) Foreign Application Priority Data

Sep. 8, 1997 (JP) .............................................. 9-243019

(51) Int. Cl.[7] ............................................. G06F 17/21
(52) U.S. Cl. ........................ 707/531; 345/752; 345/808; 345/863
(58) Field of Search ................................ 707/507, 530, 707/531, 539, 541, 522, 6, 200; 345/329, 330, 348, 808, 863, 752, 753

(56) References Cited

U.S. PATENT DOCUMENTS

| | | | | |
|---|---|---|---|---|
| 5,047,960 A | * | 9/1991 | Sloan | 707/507 |
| 5,341,293 A | * | 8/1994 | Vertelney et al. | 707/530 |
| 5,805,167 A | * | 9/1998 | Van Cruyningen | 345/808 |
| 5,815,142 A | * | 9/1998 | Allard et al. | 345/173 |
| 5,873,108 A | * | 2/1999 | Goyal et al. | 707/507 |
| 5,864,848 A | * | 6/1999 | Horvitz et al. | 707/6 |
| 6,094,197 A | * | 7/2000 | Buxton et al. | 345/863 |

FOREIGN PATENT DOCUMENTS

JP 05020274 A 1/1993

OTHER PUBLICATIONS

Negrino, Tom. "Now Contact and Up–to–Date 3.6.5" MacWorld, Jun. 1997. p. 70.*

Negrino, Tom. "Claris Organizer 2.0." MacWorld, Jan. 1997. p. 62.*

Negrino, Tom. "Full Contact Checks Back In." MacWorld, Jan. 1996. p. 121.*

Crotty, Cameron. "A Scanner on Every Desk." MacWorld, Jun. 1995. p. 123.*

Negrino, Tom. "Claris Organizer." MacWorld, Jan. 1995. p. 61.*

* cited by examiner

Primary Examiner—Joseph H. Feild
(74) Attorney, Agent, or Firm—Nixon & Vanderhye P.C.

(57) ABSTRACT

A method for generating data for an application includes the steps of determining a character string composed of at least one character to be transferred from a text displayed by a display, designating an attribution for the determined character string, and transferring the determined character string to a place corresponding to the designated attribution.

7 Claims, 14 Drawing Sheets

FIG.5

FRIDAY,DECEMBER 27,1996     10:10AM

CAPTURE

END

| SCHEDULE |
| ANNIVERSARY |
| ADDRESS BOOK |
| TELEPHONE BOOK |
| CLOCK |
| COMMUNICATION |
| HELP |
| TOOLS |

READ RECEIVED MAIL

DATE OF RECEIPT : DECEMBER 26,1996
TIME OF RECEIPT : 17:40
SENDER : SATO,ICHIRO

TITLE : NOTICE OF MEETING

CONTENT : FROM SATO@○×SOFT WARE
PLEASE BE ADVISED THAT
THE MEETING SCHEDULE HAS BEEN
DECIDED AS FOLLOWS:

DATE JANUARY 8
    TIME 10:00
    PLACE ××BUILDING,○○MEETING ROOM
    OTHER TELEPHONE NUMBER OF
        THE MEETING ROOM (06)666-6660

IF YOU HAVE ANY PROBLEMS,PLEASE LET ME KNOW
                                                CONCLUDED

FIG.7

DATE : JANUARY 8
①⇑②

TIME : 10:00
③⇑④

PLACE : ××BUILDING,○○MEETING ROOM
⑤  ⇑
⑥

OTHER : TELEPHONE NUMBER OF
THE MEETING ROOM  (06)666-6660

IF YOU HAVE ANY PROBLEMS,PLEASE LET ME KNOW

FIG.8

FRIDAY,DECEMBER 27,1996     10:10AM     START CAPTURING

DATE OF RECEIPT : DECEMBER 26,1996
TIME OF RECEIPT : 17:40
SENDER : SATO,ICHIRO

TITLE : NOTICE OF MEETING

CONTENT : FROM SATO@O×SOFT WARE
PLEASE BE ADVISED THAT
THE MEETING SCHEDULE
DECIDED AS FOLLOWS:

DATE [JANUARY 8]
    TIME 10:00
    PLACE ××BUILDING,
    OTHER TELEPHONE
    THE MEETING ROOM (00)000-0000

```
    ADDRESS
    NAME
    TELEPHONE NUMBER
⇒   MAIL ADDRESS
    DATE
    TIME
    CONTENT
```

IF YOU HAVE ANY PROBLEMS,PLEASE LET ME KNOW
                          CONCLUDED

TRANSFER     END

SCHEDULE
ANNIVERSARY
ADDRESS BOOK
TELEPHONE BOOK
CLOCK
COMMUNICATION
HELP
TOOLS

METHOD AND DEVICE FOR GENERATING APPLICATION DATA AND STORAGE MEDIUM CONTAINING THEREON A PROGRAM FOR GENERATING APPLICATION DATA

CROSS-REFERENCE TO RELATED APPLICATION

This application is related to Japanese application No. HEI 9(1997)-243019, filed on Sep. 8, 1997, whose priority is claimed under 35 USC §119, the disclosure of which is incorporated by reference in its entirety.

BACKGROUND OF THE INVENTION

1. Field of the Invention

The present invention relates to a method and a device for generating data for an application and a storage medium containing thereon a program for generating data for an application. Particularly, the method and the device are capable of being suitably used for information processing devices such as portable information handling terminals and portable electronic organizers, especially information processing devices using schedule or memorandum applications.

2. Description of Related Art

As personal computers and various kinds of software became widespread in recent years, a so-called schedule book, which has been managed with paper and pencils so far, has become capable of being managed on a personal computer. Now it is possible to manage not only a personal schedule but also progress of a group work smoothly.

Conventionally, schedule data, based on which the schedule management is conducted, is inputted manually by a user into a schedule on a personal computer, that is, into a file of a schedule management application on a personal computer. The schedule data includes, for example, contents of an electronic mail received from a customer indicating an appointment time, date and place. Conventionally, since the schedule data is manually inputted into personal computers, there may be mistakes in input.

Mistakes involved in manual input can be avoided by directly transferring text of the electronic mail into the schedule on the personal computer using a cut & paste function or the like.

However, this processing must be done with both a screen for displaying the electronic mail and a screen for inputting schedule data opened. For this reason, in terminals such as portable information handling terminals having only a small area for display, operability is significantly impaired since the screens overlay.

As technique to overcome this problem, known is an electronic information device disclosed by Japanese Unexamined Patent Publication No.HEI 5(1993)-20274. In this electronic information device, a document is produced beforehand to include a plurality of sentences each headed by a key word indicative of an attribute of the sentence. The key word indicates what kind of data the sentence represents, e.g., date, address, name or the like. When the text is used on other application such as schedule management, the text is scanned. A sentence in the text which is found by scanning to have a key word indicative of its attribute on the head is extracted as a sentence of the attribute corresponding to the key word. The extracted sentence is recorded in format data corresponding to its attributes.

However, in such an electronic information handling device, a user must always produce sentences with paying attention to the key words defining the attributes thereof. In other word, before one produces a text, one must always consider whether or not the produced text is to be used on another application. Further, the disclosed invention does not function on sentences without the addition of key words indicative of their attributes, and therefore does not function on a text such as an electronic mail which has not been produced by the user. Further, even in the case where all sentences in a text are of the same attributes, the attributes key words must be designated on every sentence.

SUMMARY OF THE INVENTION

In view of the above-described circumstances, the present invention is to provide a method and a device for generating data for an application in which an attributes is set to a selected character string in an existing text and the character string is transferred to a place corresponding to the attributes.

The present invention provides a method for generating data for an application comprising the steps of determining a character string composed of at least one character to be transferred from a text displayed by display means, designating an attributes for the determined character string, and transferring the determined character string to a place corresponding to the designated attribute.

According to the present invention, since the determined character string is transferred to the place corresponding to the designated attribute, it is possible to separately create a new sentence from the character string in the existing text for which the attribute is designated.

In other words, when an electronic mail related to an appointment is received, for example, it is possible to select a sentence indicating an appointed place, and transfer and record the sentence as schedule data or the like in a schedule management application.

BRIEF DESCRIPTION OF THE DRAWINGS

FIG. 5 illustrates an exemplary screen for reading an electronic mail in accordance with an embodiment of the present invention;

FIG. 7 illustrates the selection of textual information in accordance with an embodiment of the present invention;

FIG. 8 illustrates an exemplary attribute display screen in accordance with an embodiment of the present invention;

DESCRIPTION OF THE PREFERRED EMBODIMENTS

Figure 1:
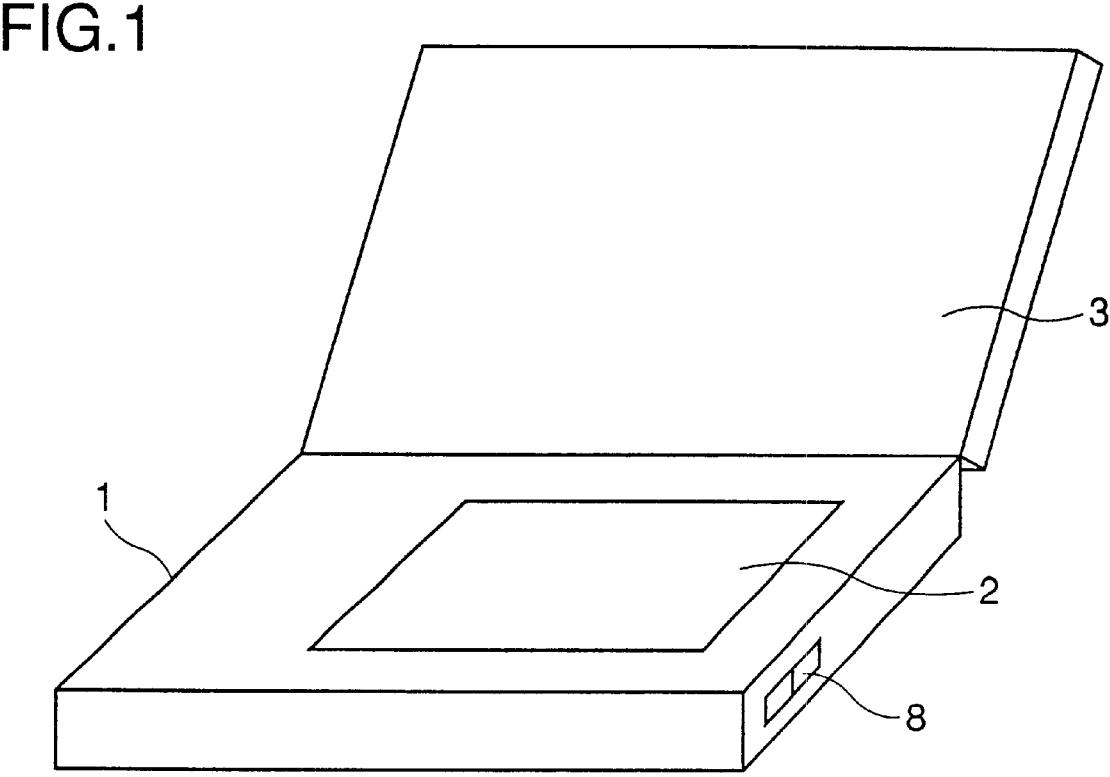
FIG. 1 is a perspective view illustrating a general appearance of an application data generating device in accordance with an embodiment of the present invention.

In the present invention, various kinds of display devices can be used as display means. Examples of such devices are a CRT display, a liquid crystal display and an EL display.

The character string in the text displayed on the display means may be composed of character codes of any kind including sign and symbol codes.

The text may be an electric mail received from an external medium.

The attribute set to the character string may be such that indicates what kind of data the character string is related to, e.g., address, name, telephone number, date, time, the content of a schedule, etc. The attribute may be represented by an identifying code of three or four bits, or the like.

In the present invention, transfer means to capture text in an electric mail received externally into an application running on the same equipment that the method of the present invention is used on, as data for the application, for example.

Accordingly, the place to which the character string is transferred may be a memory area for schedule data in a schedule application for schedule management running on the same equipment.

In the above-described construction, the determination of the character string, the designation of the attribute and the transfer of the character string may be executed by repeating a plurality of times the determination of a character string and the designation of an attribute for the character string, and then transferring the determined plural character strings to the places corresponding to the designated attributes by a single operation. Thereby the plural character strings can be all transferred at one time.

More particularly, when an electronic mail related to an appointment is received, sentences indicating an appointed place, time and the like can be sequentially selected and then transferred as schedule data or the like in the schedule management application at a time.

Also the determination of the character string, the designation of the attribute and the transfer of the character string may be executed by determining all the text displayed on the display means, designating a single attribute for all the text and transferring all the text to a single place, automatically by actuating a specific key. With this construction, the text can automatically be transferred to the same place.

More particularly, when an electronic mail related to an appointment is received, all sentences can be automatically transferred and recorded as schedule data or the like in the schedule management application only by a single operation without need to select textual information indicating, for example, an appointed place or set the attribute to the textual information.

In another aspect, the present invention provides a device for generating data for an application. The device comprises determination means for determining a character string composed of at least one character to be transferred from a text displayed by display means; attribute designating means for designating an attribute for the determined character string; and transfer means for transferring the determined character string to a place corresponding to the designated attribute.

The present invention further provides a computer-readable record medium containing thereon a program to cause a computer operation to perform the above-described processes for generating application data.

Suitable examples of the storage media are a CD-ROM, a floppy disk and an IC card. However, also usable are storage devices shared with other devices such an inner memory of a CPU, a hard disk and a file server via a communication function.

The present invention is described in detail by way of example thereof with reference to the accompanying drawings.

In the following description, the present invention is explained by examples in which a received electronic mail (e-mail) is captured as schedule data. However, these examples are not construed to limit the scope of the invention. The invention can realize an easy transfer of data to other applications by being modified into such forms wherein an e-mail is captured into a memorandum application and schedule data is captured into an address book application, for example.

FIG. 1 is a perspective view illustrating a general appearance of an application generating device in accordance with one embodiment of the present invention.

In FIG. 1, the device of the invention includes a main unit cabinet 1 and a cover 3.

The cabinet 1 has an input/output section 2 comprised of a display section and a transparent tablet which are integral with each other, an infrared communication section not shown, a pen holder not shown, and the like. The cabinet 2 contains therein a power supply section for supplying power to sections requiring power such as the input/output section 2, the infrared communication section and control circuits for controlling the input/output section 2, the infrared communication section, an interface and the like.

The input/output section 2 will be described in detail later with reference to FIG. 2.

The cover 3 is connected to the rear side of the cabinet 1 with hinges. The cover 3 pivots to cover the input/output section 2 and serves to protect the input/output section 2 when the device is carried.

On a side of the cabinet 1, there is provided a power supply switch 8 for switching on/off the power supply to the main unit.

Figure 2:
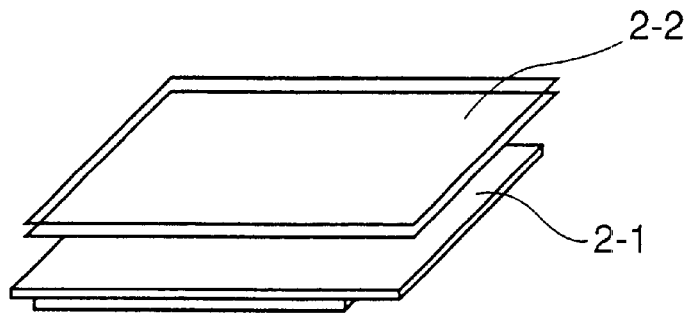
FIG. 2 is an exploded perspective view illustrating an input/output section of the application data generating device.

FIG. 2 is an exploded perspective view illustrating the input/output section 2.

The input/output section 2 has an integral construction of a thin liquid crystal display 2-1 of matrix system capable of displaying characters and a transparent tablet 2-2 which is large enough to cover the liquid crystal display 2-1.

The liquid crystal display 2-1 may be provided with a back light of an EL panel or the like on the rear side thereof as required.

The transparent tablet 2-2 is comprised of two transparent sheets each provided with a transparent electrode on the inner surface thereof. The sheets are printed with regular spacers in the form of small protrusions to prevent the electrodes from contacting each other in a normal state. When the transparent tablet 2-2 is touched by a finger or a pen for indication, the transparent electrodes contact each other. Thereby an indicated position is detected.

By synchronizing a content displayed on the liquid crystal display 2-1 and positional information of the indicated position, the position on the liquid crystal display 2-1 indicated by a user is detected.

Figure 3:
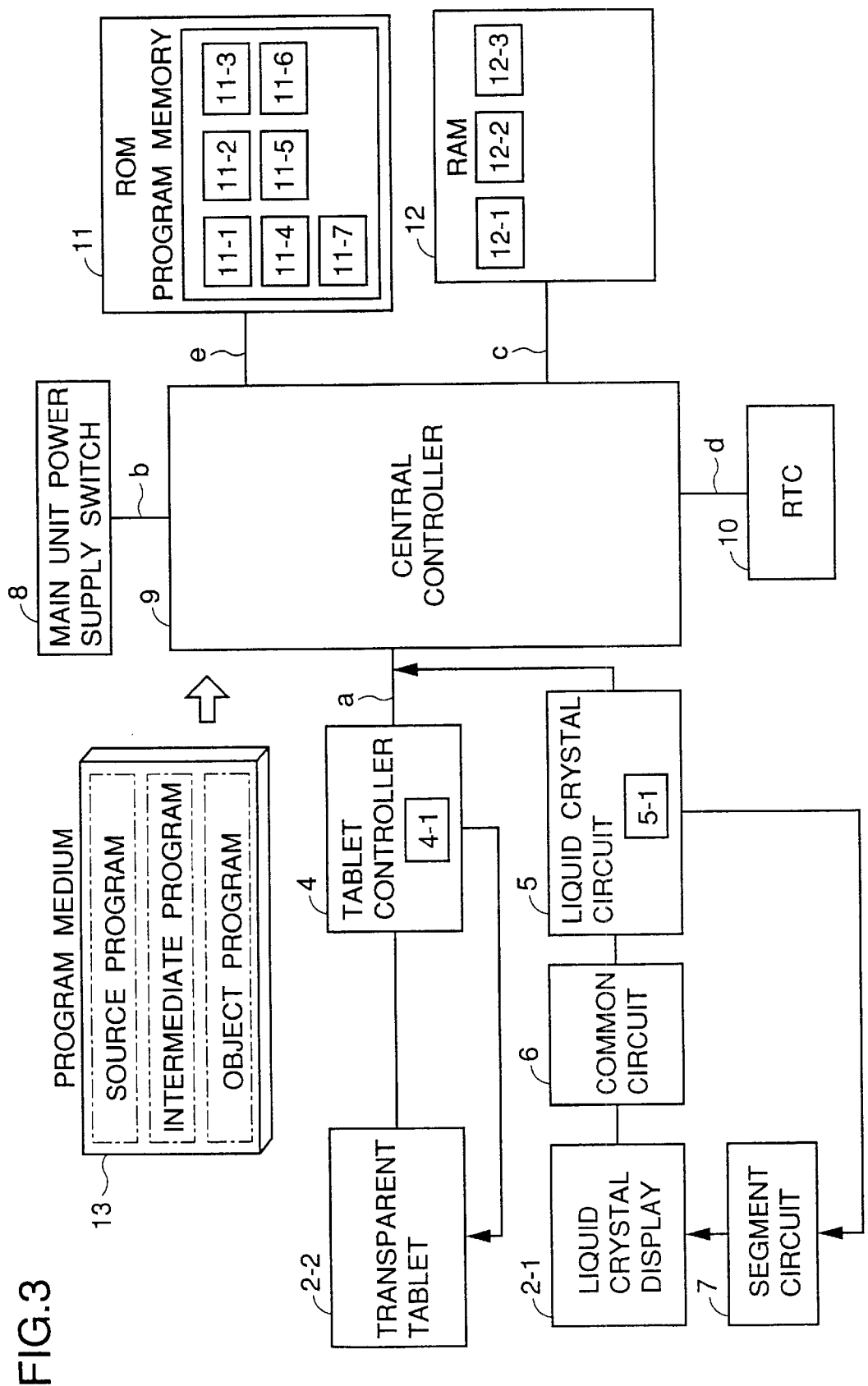
FIG. 3 is a block diagram illustrating an overall constitution of the application data generating device.

FIG. 3 is a block diagram illustrating an overall construction of the application data generating device.

The application data generating device of the present invention is comprised of the liquid crystal display 2-1, the transparent tablet 2-2, a tablet controller 4, a liquid crystal circuit 5, a common circuit 6, a segment circuit 7, the main unit power supply switch 8, a central controller 9, an RTC 10, a ROM 11, a RAM 12 and a program medium 13.

The tablet controller 4 is for taking coordinate information from the transparent tablet 2-2. The tablet controller 4 is connected to the transparent electrodes disposed on the two transparent sheets of the transparent tablet 2-2. The tablet controller 4 detects the coordinate of a position indicated by the finger or pen on the basis of the contact of the transparent electrodes.

The liquid crystal circuit 5 stores dot positions for lighting the liquid crystal as a bit map and send signals to the common circuit 6 and the segment circuit 7 as required.

The central controller 9 controls input or output data by various instructions.

The RTC 10 clocks time by clock signals and outputs the present year, month, day, and time.

The ROM 11 has a program memory area for storing programs to control operation of the central controller 9. This program memory area stores various applications 11-1 as well as programs to cause the central controller 9 to function as a capture control section 11-2, a selected text control section 11-3, a new text producing section 11-4, a monitor control section 11-5 and a text attribute setting control section 11-6. Further the area stores a user program 11-7 which is used by the user as purposes demand. These programs will be described in detail later.

The RAM 12 has areas for a various texts memory 12-1, a capture-for-processing memory 12-2 and a text buffer memory 12-3. These memories will also be described in detail later.

The program medium 13 records programs to be stored in the ROM 11. In the device of the present invention, programs necessary for causing the device to function are read from the program medium 13 by use of program reading means not shown and written in the program memory of the ROM 11 as translated executable program codes beforehand.

The program medium 13 is an information storage medium constructed to be capable of being separated from the main unit. Suitable examples thereof are a CD-ROM, a floppy disk and an IC card. As the information storage medium, also usable are memories shared with other devices such as an inner memory of the CPU, a hard disk and a file server via communication means.

The program medium 13 stores therein executable programs which is read into the central controller 9, a source program capable of producing an executable programs and an intermediate program.

In FIG. 3, lines a, b, c, d and e are control lines from the tablet controller 4, from the main unit power supply switch 8, from the RAM 12, from the RTC 10 and from the ROM 11, respectively.

With this construction, explained is a process for selecting a specific character string or specific character strings from an existing text and setting its/their attribute(s), and transferring the specific character string(s) one by one or by a single operation to (a) place(s) corresponding to its/their attribute(s) as (a) new text(s). In particular, explanation is given with an example of transferring a received e-mail as schedule data for a schedule application.

Figure 4:
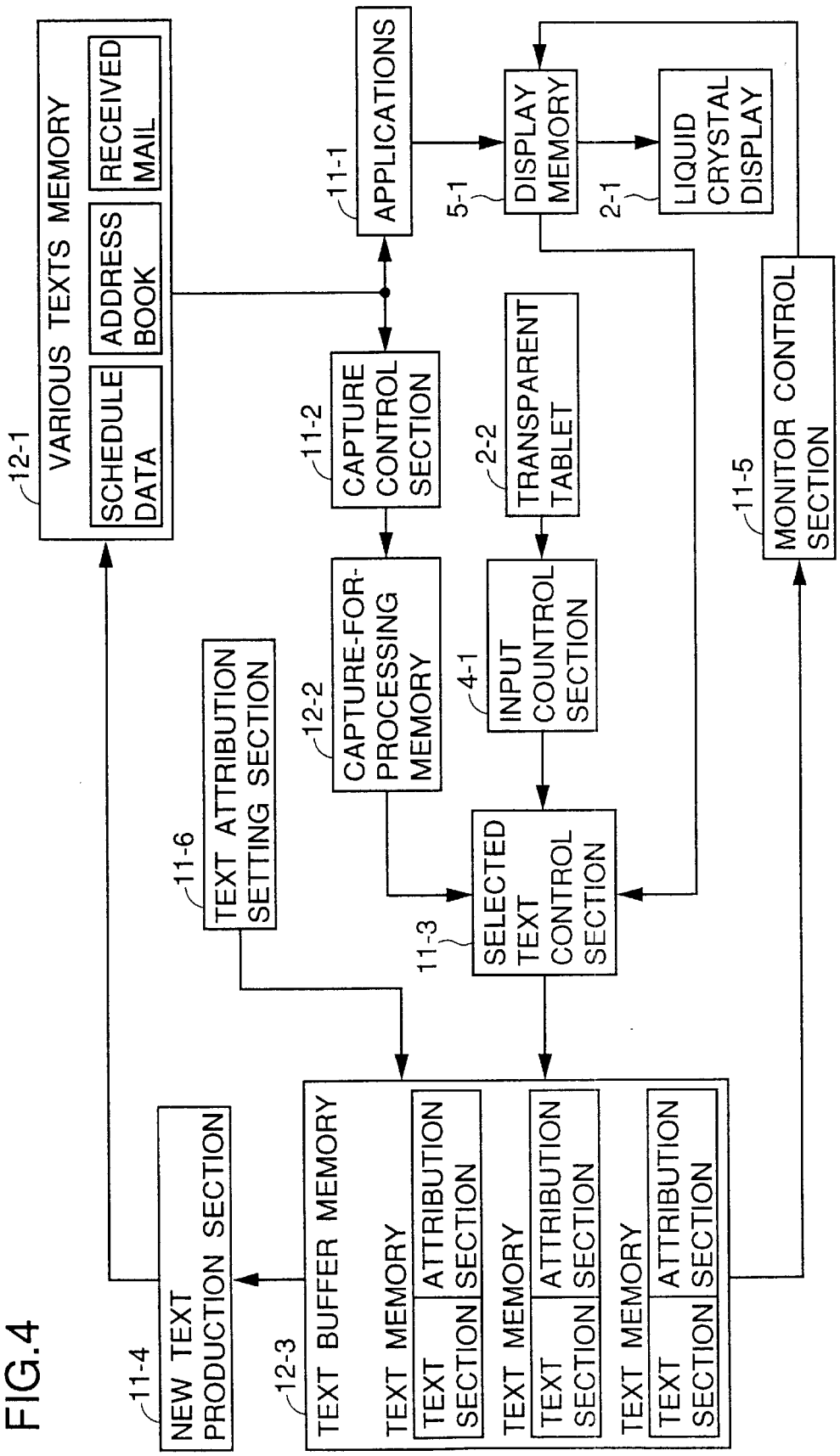
FIG. 4 is a block diagram illustrating the application data generating device on the basis of functions.
Figure 6:
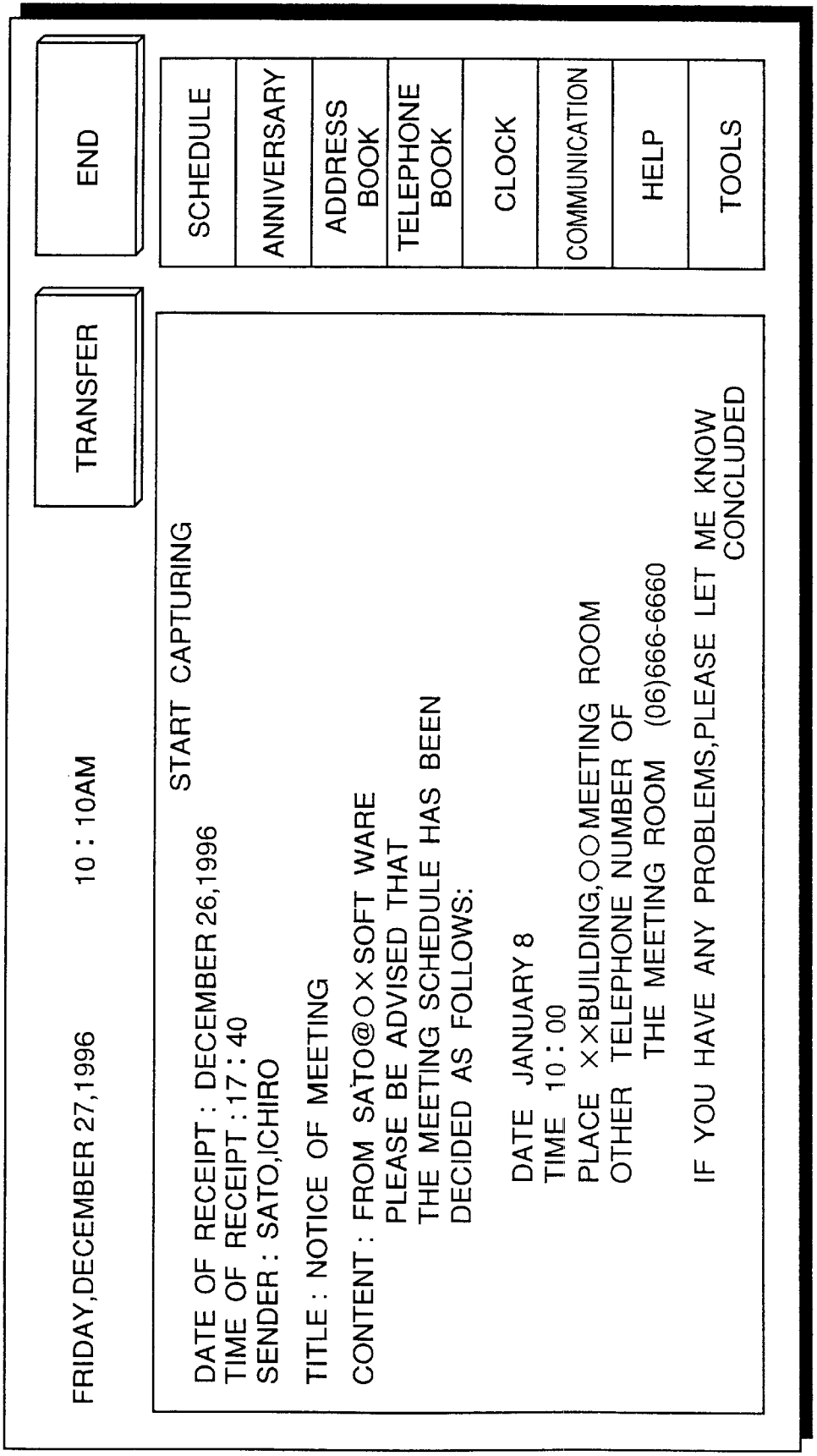
FIG. 6 illustrates an exemplary screen for capturing data in accordance with an embodiment of the present invention.
Figure 9:
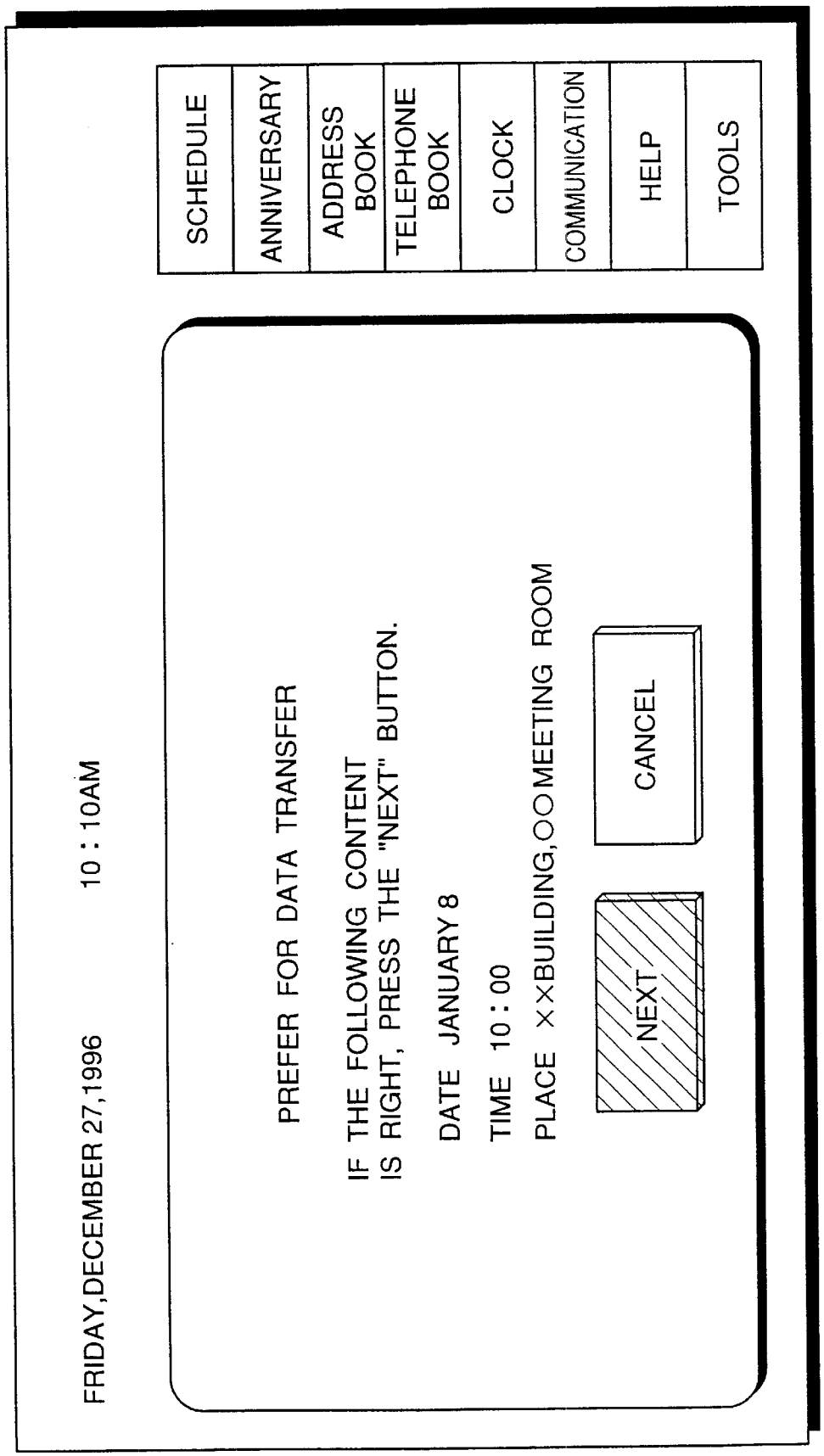
FIG. 9 illustrates an exemplary screen for checking data to be transferred in accordance with an embodiment of the present invention.
Figure 10:
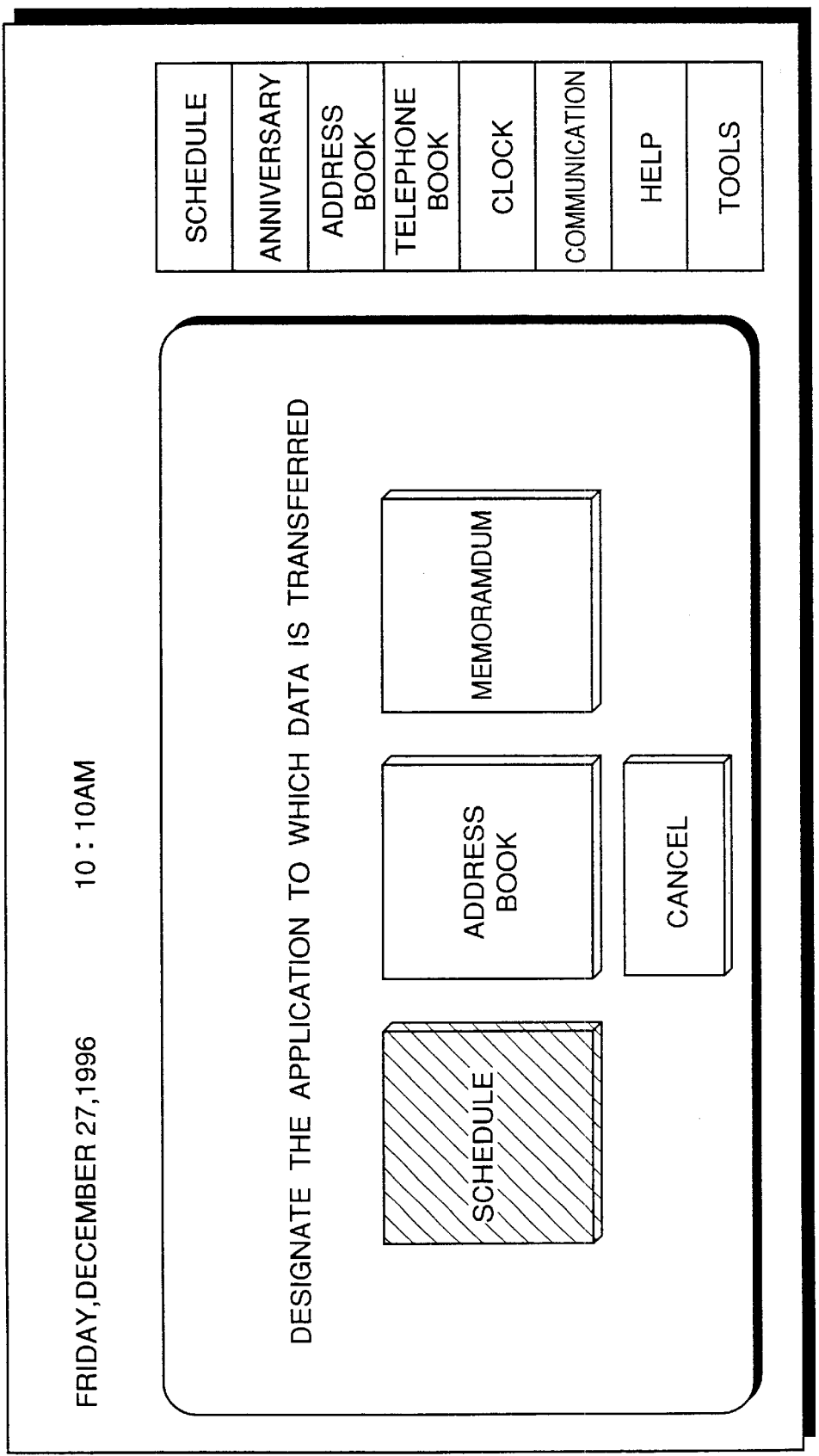
FIG. 10 illustrates an exemplary screen for designating where to transfer the selected textual information in accordance with an embodiment of the present invention.
Figure 11:
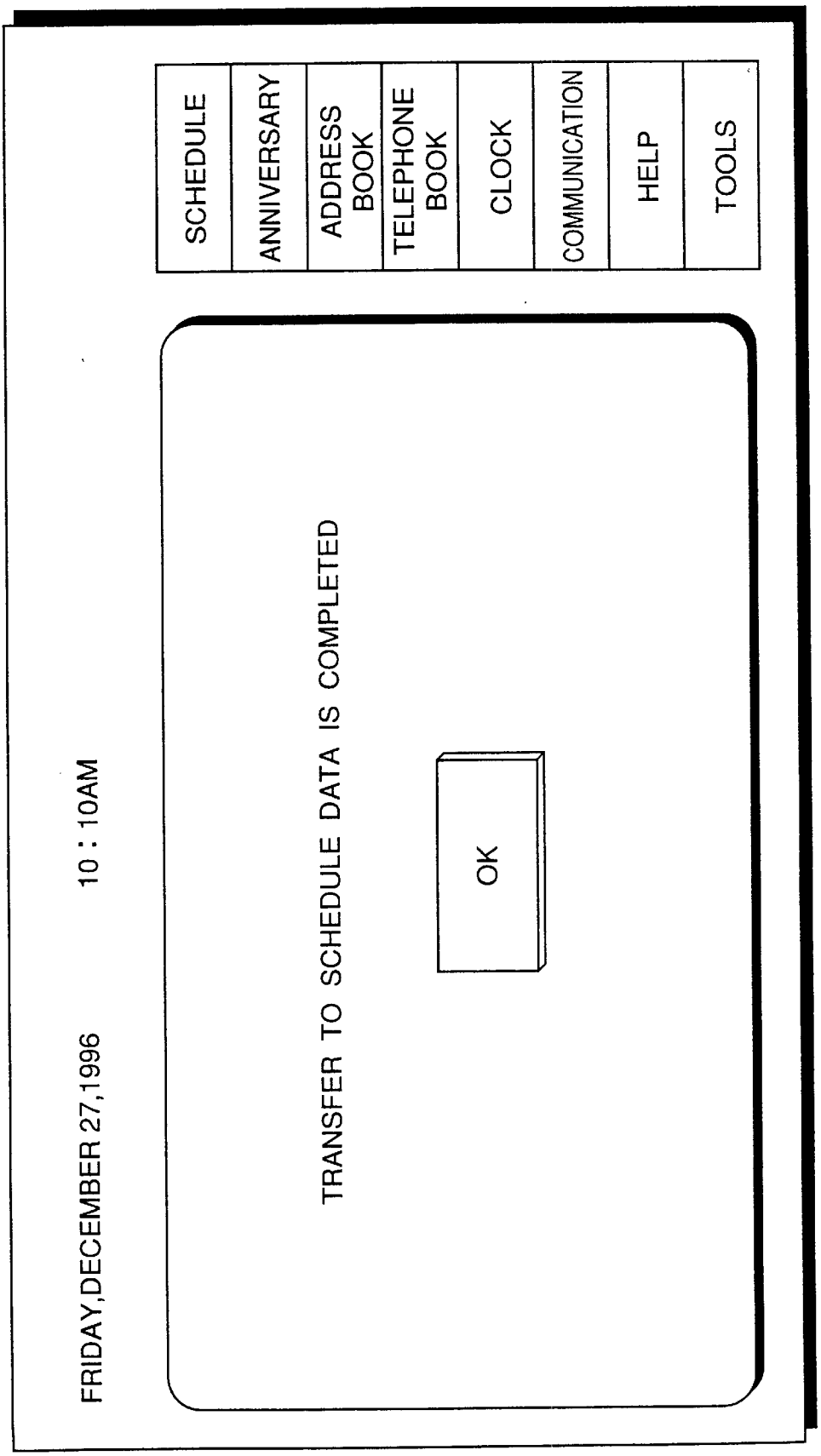
FIG. 11 illustrates an exemplary screen for indicating the completion of transfer in accordance with an embodiment of the present invention.
Figure 14:
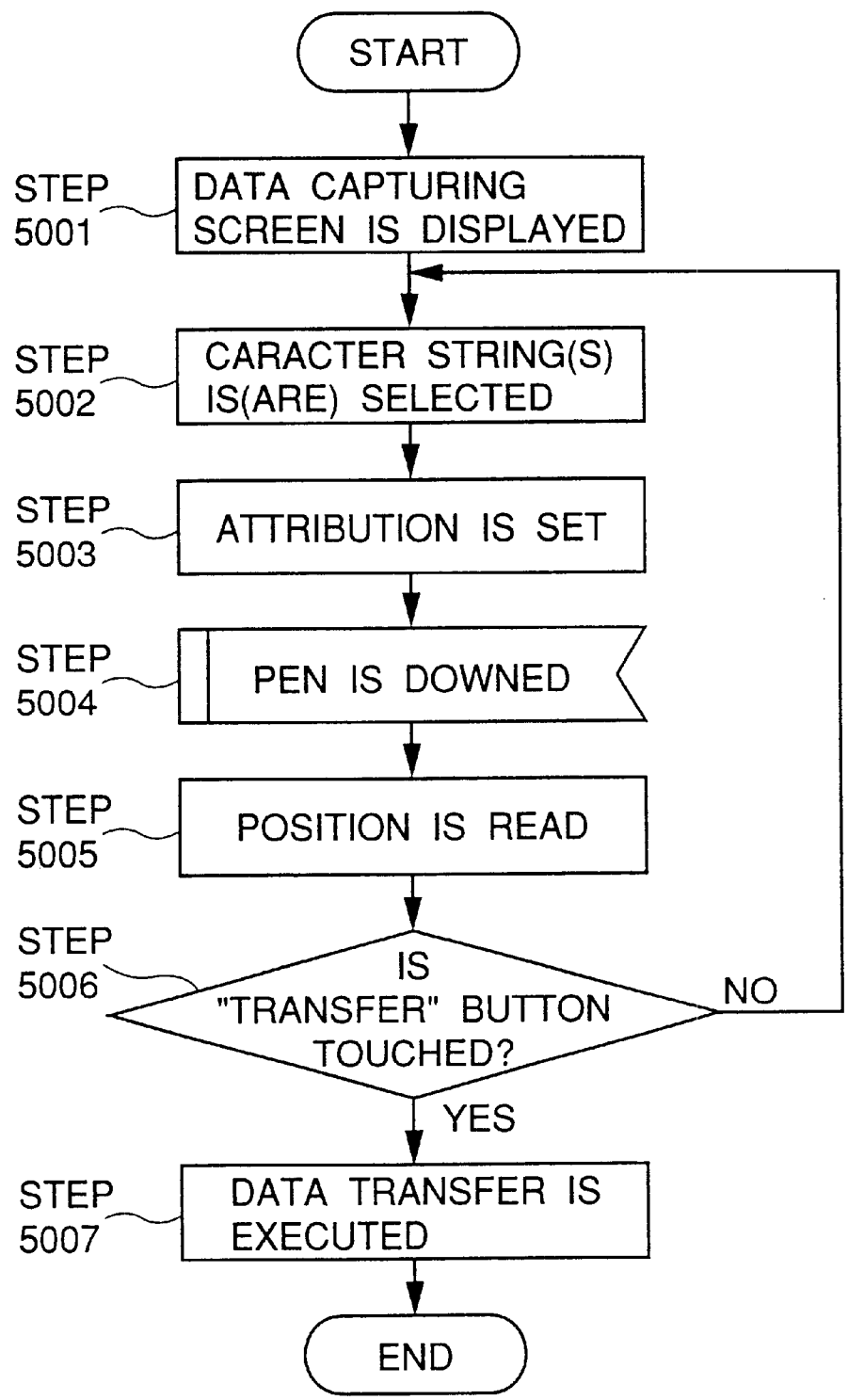
FIG. 14 is a flowchart illustrating a data transfer process in accordance with an embodiment of the present invention.

FIG. 4 is a block diagram illustrating the application data generating device on the basis of functions. FIG. 14 is a flowchart illustrating a data transfer process in the device. Referring to these figures, further with reference to illustrations in FIGS. 5 to 12 showing displayed states on the screen, the explanation is given.

In FIG. 4, memories such as a loop counter which can be realized in sizes of about one byte are not shown. Such memories are assumed to be realized by a register of the central controller 9 and detailed explanation thereof is omitted.

First, a screen on which a received electronic letter is being read is shown in FIG. 5.

In this state, if a user downs an input pen onto a position on the transparent tablet 2-2 which position corresponds to a "capture" button of the liquid crystal display 2-1 (an upper right button position in FIG. 5) the process shown in the flowchart of FIG. 14 starts.

In STEP5001 of the flowchart, a text (a receive e-mail in this example) in the various texts memory 12-1 is transferred to the capture-for-processing memory 12-2 by the capture control section 11-2, and then a data capture screen (FIG. 6) is displayed. An enlarged part of the data capture screen is a screen for explaining text selection (FIG.7). In FIG.7, encircled numbers and arrows are added on the actually displayed screen only for explanation.

In STEP5002, when the user downs the pen on the transparent tablet 2-2, the transparent tablet 2-2 turns to a state of accepting an input to handle an interrupt. An input control section 4-1 reads the coordinate of a position (represented by ① in FIG. 7) on the transparent tablet 2-2 onto which the user downs the pen, as a starting coordinate. The selected text control section 11-3 watches move of the pen by the user and reads the coordinate of a position at which the user ups the pen, as an ending coordinate.

This process corresponds to a process from the downing of the pen onto the position ①, and then the move of the pen in the direction of an arrow to a position ② with the pen kept down, to the upping of the pen at the position ②, in FIG. 7.

The selected text control section 11-3 reads a character string displayed from the starting coordinate to the ending coordinate from the capture-for-processing memory 12-2 and copies the string in a text section of a text memory in the text buffer memory 12-3. By this operation, "January 8" is selected and the selected area is displayed encircled with a dotted line, for example, as on an attribute display screen in FIG. 8.

In STEP5003, the attribute display screen (a pop-up screen in FIG. 8) is displayed next to the selected area. For "January 8" in this example, an attribute "date" is designated by the user downing the pen onto "Date" displayed in the pop-up screen (as indicated by an arrow in FIG. 8). This attribute is inputted to an attribute section of the text memory in the text buffer memory 12-3 by the text attribute setting control section 11-6.

In STEP5004, when the user downs the pen on the transparent tablet 2-2, the transparent tablet 2-2 turns to the state of accepting an input to handle an interrupt.

In STEP5005, the input control section 4-1 reads the coordinate of a position on the transparent tablet 2-2 onto which the pen is downed.

In STEP5006, if the coordinate of the position corresponds to a "transfer" button (a button located in the upper right in FIG. 8), the process goes to STEP5007. Otherwise, the process goes back to STEP5002, and a so-called loop is performed.

Accordingly, by repeating the process from STEP5002 to STEP5006, a plurality of combinations of attribute with character strings can be selected and set. For example, the pen is downed onto a position ③ in FIG. 7 and then upped at a position ④, and then an attribute "time" is selected on the pop-up screen in FIG. 8. Subsequently, the pen is downed onto a position ⑤ and upped at a position ⑥, and then an attribute "content" is selected on the pop-up screen.

In STEP5007, a transfer data checking screen (FIG. 9) is displayed.

Items displayed at this time are combinations of the character strings and their attributes selected and set in STEP5002 and STEP5003.

Then by the user downing the pen on the transparent tablet 2-2, the transparent tablet 2-2 is turned to the state of accepting an input to handle an interrupt. The input control section 4-1 reads the coordinate of a position on the transparent tablet 2-2 onto which the pen is downed.

If the coordinate of the position corresponds to a "next" button (a shadowed button in FIG. 9), a where-to-transfer designation screen (FIG. 10) is displayed. Buttons displayed on the where-to-transfer designation screen are related to applications controlled by the new text generation section 11-4.

Then by the user downing the pen on the transparent 7546 tablet 2-2, the transparent tablet 2-2 is turned to the state of accepting an input to handle an interrupt. The input control section 4-1 reads the coordinate of a position on the transparent tablet 2-2 onto which the pen is downed.

If the coordinate of the position corresponds to a "schedule" button (a shadowed button in FIG. 10), the new text generation section 11-4 stores a content in the text memory of the text buffer memory 12-3 as a new text in the various texts memory 12-1. After the transfer is completed, a transfer completion screen (FIG. 11) is displayed.

Figure 12:
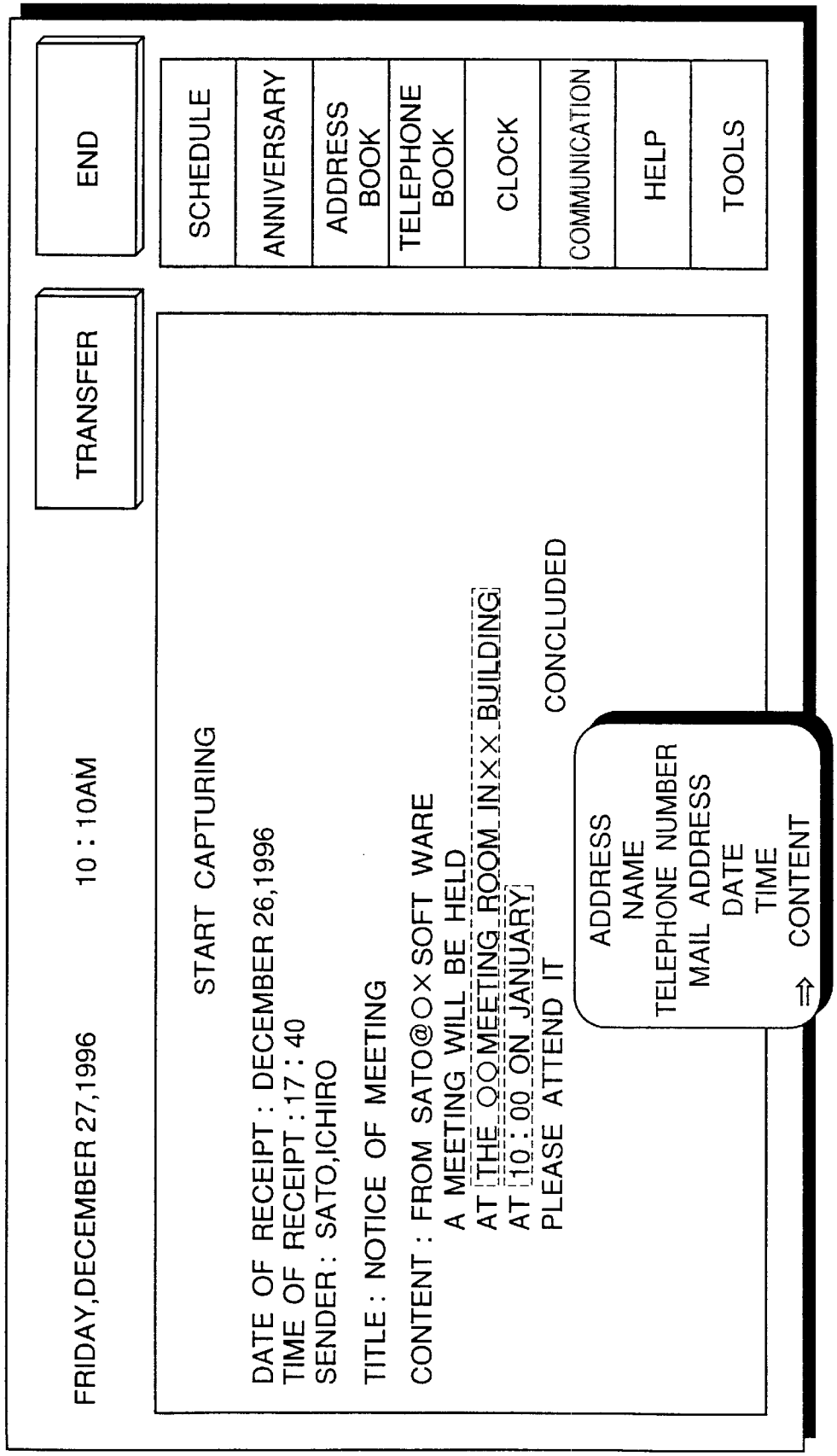
FIG. 12 illustrates an exemplary screen for capturing data and displaying attributes in the case where the attribute is not specified in a sentence in accordance with an embodiment of the present invention.
Figure 13:
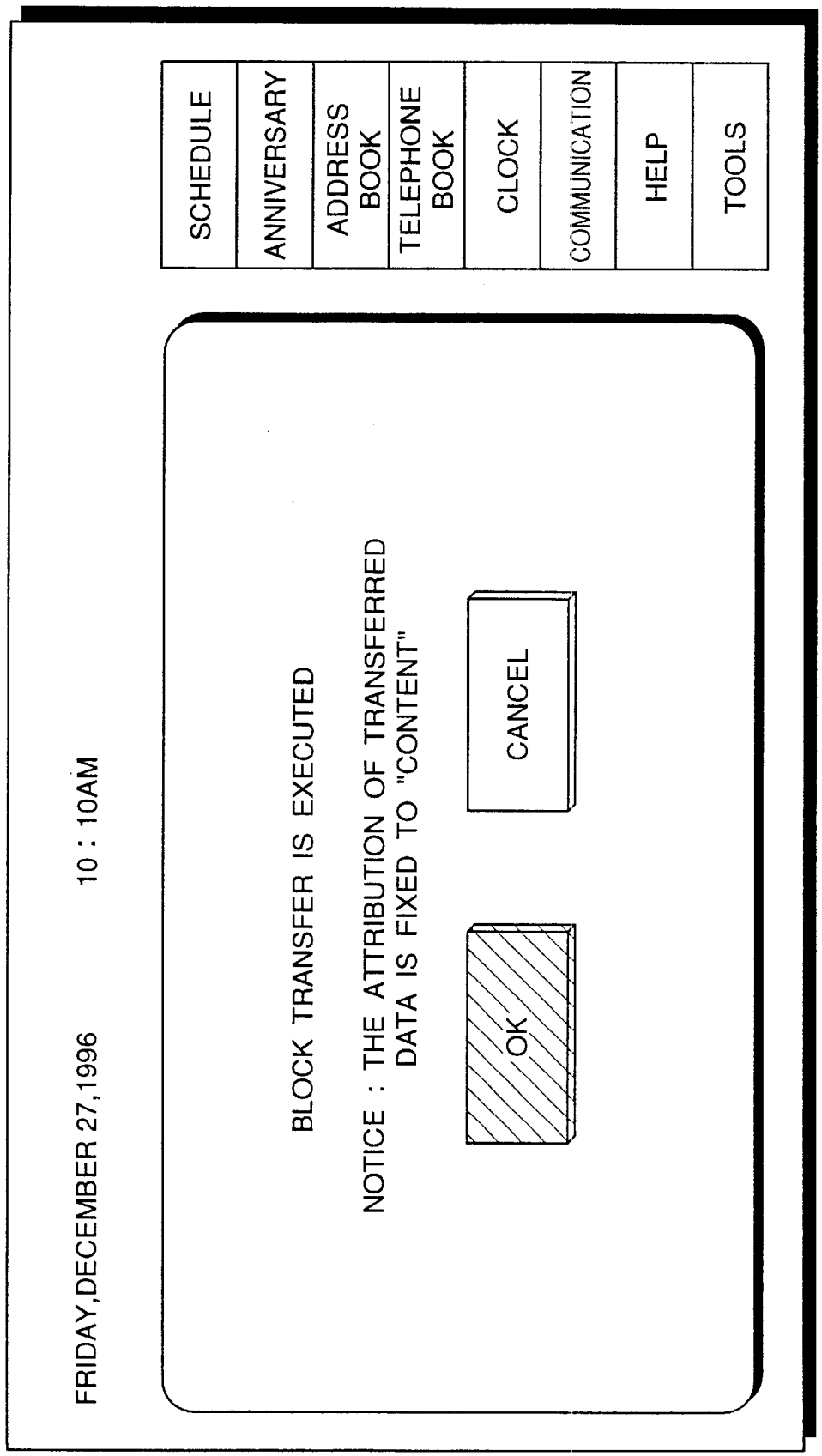
FIG. 13 illustrates an exemplary screen for checking a block transfer in accordance with an embodiment of the present invention.

The process has been explained with the example wherein the attributes are clearly shown in the existing text. According to the above-described method, however, even in a text as shown in FIG. 12, for example, a character string to be captured can be selected, its attribute can be set with the pen, and thereby the character string can be inputted into a new text.

In this manner, a set of processes can be performed for transferring a single or plural particular character string(s) in an existing text by a single operation or one by one to (a) new text(s) by setting the correspondence of the character string(s) and its/their attribute(s).

For example, a received e-mail is transferred as schedule data using a portable information handling terminal or an electronic organizer. Data such as addresses, names, telephone numbers, mail addresses, dates, times, contents and the like are stored as data items of a schedule management application used with the portable information handling terminal or the electronic organizer. At the time when the e-mail is received, a certain area of the received data can be designated, and an attribute (e.g., address, name or the like, in this case) can be set for the data in the designated area. Then, by instructing transfer, the particular part of the data received as the e-mail can be captured in the place of an item such as "address," "name" or the like that is designated as an attribute for schedule data.

Then, explanation is given to a process of setting a single attribute for all sentences in an existing text and transferring all the sentences as a new text to one place corresponding to the attribute only by a particular operation. For example, all sentences in a received e-mail is transferred to an item "content" of schedule data.

Figure 15:
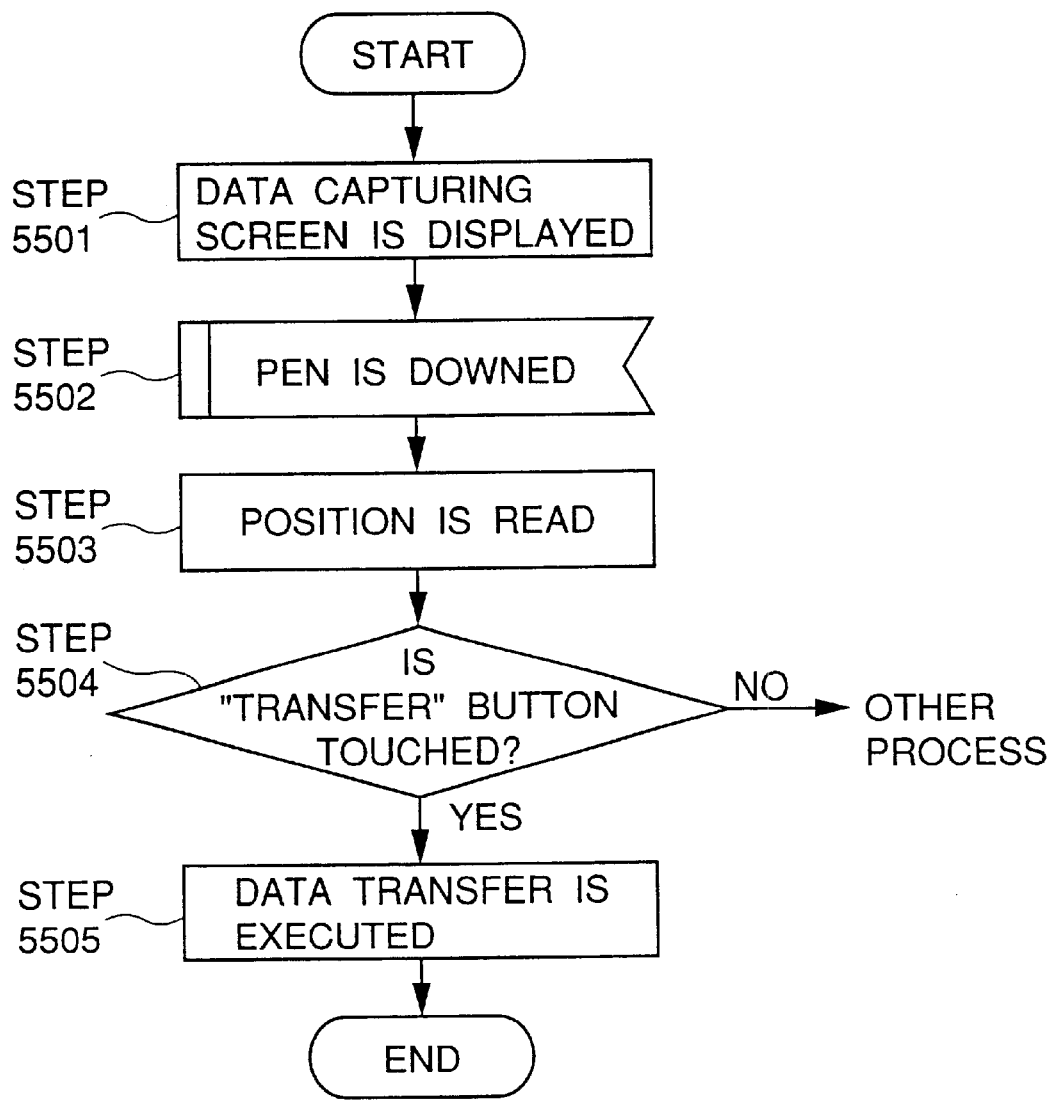
FIG. 15 is a flowchart illustrating a block data transfer process in accordance with an embodiment of the present invention.

FIG. 15 is a flowchart illustrating a block data transfer process of the device of the present invention. Now, explanation is given with reference to this flowchart and FIG. 4 as well as illustrations of FIGS. 5 to 13 showing displayed states on the screen.

In the explanation of the process, unessential processes such as exceptional processes are handled as miscellaneous processes on the flowchart.

On the screen shown in FIG. 5, a received e-mail is being read.

In this state, if the user put the pen down onto a position on the transparent tablet 2-2 which position corresponds to the "capture" button (an upper right button potion in FIG. 5) on the liquid crystal display 2-1, the process shown in the flowchart of FIG. 15 commences.

In STEP5501 in this flowchart, a text (a received e-mail in this example) in the various texts memory 12-1 is transferred to the capture-for-processing memory 12-2 by the capture control section 11-2, and then the data capture screen (FIG. 6) is displayed.

In STEP5502, the transparent tablet 2-2 is turned to the state of accepting an input to handle an interrupt by the user downing the pen on the transparent tablet 2-2.

In STEP5503, the input control section 4-1 reads the coordinate of a position on the transparent tablet 2-2 onto which the pen is downed.

In STEP5504, if the coordinate of the pen-downed position on the transparent tablet 2-2 corresponds to the "transfer" button (the button located in the upper right in FIG. 6), the process goes to STEP5505. Otherwise, other process is carried out.

In STEP5505, a block transfer checking screen (FIG. 13) is displayed. In this example, the attribute is set to "content" by the text attribute setting control section 11-6.

Then the transparent tablet 2-2 is turned to the state of accepting an input to handle an interrupt by the user downing the pen on the transparent tablet 2-2. The input control section 4-1 reads the coordinate of the pen-downed position on the transparent tablet 2-2.

If the coordinate of the pen-downed position on the transparent tablet 2-2 corresponds to an "OK" button (a shadowed button in FIG. 13), the content in the capture-for-processing memory 12-2 is copied to the text section of the text memory in the text buffer memory 12-3, and the attribute "content" is written in the attribute section of the text memory in the text butter memory 12-3. Then the where-to-transfer designation screen (FIG. 10) is displayed.

Each button displayed on the where-to-transfer designation screen is related to an application controlled by the new text generation section 11-4.

Then, the transparent tablet 2-2 is turned to the state of accepting an input to handle an interrupt by the user downing the pen on the transparent tablet 2-2. The input control section 4-1 reads the coordinate of the pen-downed position on the transparent tablet 2-2.

If the pen-downed position on the transparent tablet 2-2 corresponds to a "schedule" button (a shadowed button in FIG. 10), the content in the text memory in the text buffer memory 12-3 is transferred and recorded as a new text in the various texts memory 12-1 by the new text generation section 11-4. After the completion of the transfer, the transfer completion screen (FIG. 11) is displayed.

Thus, all the sentences in the existing text can be designated to be of the same attribute and transferred in a block as a new text to the place of the same attributes only by the particular operation.

For example, the user uses a schedule management application installed in a portable information handling terminal or an electronic organizer which are capable of receiving e-mails and items such as address, name, telephone number, mail address, date, time and content are recorded as data items for the schedule management application. When the user receives an e-mail, the user can transfer all data of the received e-mail in a block to the item "content" item of schedule data by designating the block transfer.

As described above, according to the present invention, even in the case of a text such as a received e-mail, which has not been created by the user, attributes can be designated for character strings in the text and thus new texts of the designated attributes can be produced. Therefore, the new texts can be produced efficiently.

Further, the present invention is effective in producing new texts from existing texts. Accordingly, when the user creates a text which may be utilized as an existing text in the future, the user does not need to consider future utilization of the text.

Still further, if an entire text is attributed to the same attribute like a memorandum, the attribute of character strings need not be designated. Therefore, in producing a new text from an existing text, efficient operation can be ensured.

According to the present invention, even a text which has not been created by the user, such as a received e-mail, can be efficiently utilized for producing a new text, by designating an attribute for a character string in the text and producing a new text of the designated attribute.

What is claimed is:

1. A method for generating data in a data file for an application from text displayed on a display of a pen-touch inputting tablet device having an associated input pen, wherein said application uses data from said data file having a plurality of different types of attributes, said method comprising the steps of:

determining by a user a character string in said text including at least one character to be put in said data file, wherein said determining is performed by touching the display with said input pen at a location that corresponds to the character string;

designating by the user an attribute for said character string, wherein said attribute corresponds to one of the plurality of different types of attributes used by said application, wherein said designating includes causing a pop-up menu to be displayed upon detection of removal of the input pen from the display after determining the character string, said pop-up menu including a list of available attributes for selection by the user with the input pen;

transferring said character string to said data file to generate said data, wherein said transferring includes automatically deciding where to transfer said character string in said data file based on the attribute designated by said user, and maintaining said data file for use as an input data file for said application.

2. The method of claim 1, wherein said text is an electronic mail received from an external medium.

3. The method of claim 1, wherein the application is a scheduling application and said plurality of attributes for said data used by said application include address, name, telephone number, mail address and content.

4. The method of claim 1, wherein said data file is a schedule data file for a scheduling application which is running on a same device as said method is being used, and further wherein said schedule data file is stored in a memory area designated for said schedule data file.

5. The method of claim 1, wherein said steps of determining and designating are performed a plurality of times, thereby resulting in a plurality of designated character strings each having an associated attribute, and further wherein said step of transferring includes transferring all of said character stings to said data file at substantially the same time.

6. The method of claim 1, wherein said step of designating enables the user to selectively designate all of said text on said display, and further wherein said steps of designating and transferring are automatically executed upon selection of a predefined key.

7. A computer readable medium containing a computer program for generating data in a data file for an application from text displayed on a display of a pen-touch inputting tablet device having an associated input pen, wherein said application uses data from said data file having a plurality of different types of attributes, said computer program including instructions for enabling the following steps to be performed:

determining by a user a character string in said text including at least one character to be put in said data file, wherein said determining is performed by touching the display with said input pen at a location that corresponds to the character string;

designating by the user an attribute for said character string, wherein said attribute corresponds to one of the plurality of different types of attributes used by said application, wherein said designating includes causing a pop-up menu to be displayed upon detection of removal of the input pen from the display after determining the character string, said pop-up menu including a list of available attributes for selection by the user with the input pen;

transferring said character string to said data file to generate said data, wherein said transferring includes automatically determining where to transfer said character string in said data file based on the attribute designated by said user; and maintaining said data file for use as an input data file for said application.

* * * * *